(12) United States Patent
Shen

(10) Patent No.: US 8,438,659 B2
(45) Date of Patent: May 7, 2013

(54) PORTABLE COMPUTING DEVICE AND HEADSET INTERFACE

(75) Inventor: Yangmin Shen, Peoria, IL (US)

(73) Assignee: Vocollect, Inc., Pittsburgh, PA (US)

( * ) Notice: Subject to any disclaimer, the term of this patent is extended or adjusted under 35 U.S.C. 154(b) by 323 days.

(21) Appl. No.: 12/613,102

(22) Filed: Nov. 5, 2009

(65) Prior Publication Data

US 2011/0107415 A1    May 5, 2011

(51) Int. Cl.
*G06F 1/26* (2006.01)

(52) U.S. Cl.
USPC .......................................................... 726/34

(58) Field of Classification Search .................. None
See application file for complete search history.

(56) References Cited

U.S. PATENT DOCUMENTS

| | | |
|---|---|---|
| 1,483,315 A | 2/1924 | Saal |
| 2,506,524 A | 5/1950 | Stuck |
| 2,782,423 A | 2/1957 | Wiegand et al. |
| 2,958,769 A | 11/1960 | Bounds |
| 3,087,028 A | 4/1963 | Ernest |
| 3,192,326 A | 6/1965 | Chapman |
| 3,327,807 A | 6/1967 | Mullin |
| 3,568,271 A | 3/1971 | Husserl |
| 3,654,406 A | 4/1972 | Reinthaler |
| 3,682,268 A | 8/1972 | Gorike |
| 3,969,796 A | 7/1976 | Hodsdon |
| 3,971,900 A | 7/1976 | Foley |
| 3,971,901 A | 7/1976 | Foley |
| 3,984,885 A | 10/1976 | Yoshimura et al. |
| 4,018,599 A | 4/1977 | Hill et al. |
| 4,020,297 A | 4/1977 | Brodie |
| 4,024,368 A | 5/1977 | Shattuck |
| 4,031,295 A | 6/1977 | Rigazio |
| 4,039,765 A | 8/1977 | Tichy |
| 4,138,598 A | 2/1979 | Cech |
| 4,189,788 A | 2/1980 | Schenke |

(Continued)

FOREIGN PATENT DOCUMENTS

| | | |
|---|---|---|
| CN | 201204685 | 3/2009 |
| DE | 3604292 | 8/1987 |

(Continued)

OTHER PUBLICATIONS

Lawrence Rabiner and Biing-Hwang Juang, Fundamentals of Speech Recognition, Prentice Hall PTR, United States edition (Apr. 22, 1993), ISBN: 0130151572, pp. 95-117.

(Continued)

*Primary Examiner* — Brandon Hoffman

(74) *Attorney, Agent, or Firm* — Wood, Herron & Evans, LLP

(57) ABSTRACT

A method of authenticating the interoperability of a headset and a device, as well as a headset and a device, is provided. The method includes, in a headset, monitoring at least one input for a verification signal, and, in response to failing to detect the verification signal within a predetermined period of time, selectively disabling a speaker and/or microphone of the headset. An alternative method includes, in a device, detecting a coupling of a headset to the device, transmitting a verification signal to the headset, and receiving, from the headset, at least one of a serial number associated with the headset, an identification of a user of the headset, a security certificate, or a voice translation template associated with the user.

38 Claims, 5 Drawing Sheets

U.S. PATENT DOCUMENTS

| | | |
|---|---|---|
| 4,239,936 A | 12/1980 | Sakoe |
| RE30,662 E | 6/1981 | Foley |
| 4,302,635 A | 11/1981 | Jacobsen |
| 4,357,488 A | 11/1982 | Knighton et al. |
| 4,409,442 A | 10/1983 | Kamimura |
| 4,418,248 A | 11/1983 | Mathis |
| 4,471,496 A | 9/1984 | Gardner |
| 4,472,607 A | 9/1984 | Houng |
| 4,499,593 A | 2/1985 | Antle |
| 4,625,083 A | 11/1986 | Poikela |
| 4,634,816 A | 1/1987 | O'Malley et al. |
| 4,672,672 A | 6/1987 | Eggert et al. |
| 4,672,674 A | 6/1987 | Clough |
| 4,689,822 A | 8/1987 | Houng |
| 4,783,822 A | 11/1988 | Toole et al. |
| 4,821,318 A | 4/1989 | Wu |
| 4,845,650 A | 7/1989 | Meade et al. |
| 4,875,233 A | 10/1989 | Derhaag |
| 4,907,266 A | 3/1990 | Chen |
| 4,952,024 A | 8/1990 | Gale |
| 5,003,589 A | 3/1991 | Chen |
| 5,018,599 A | 5/1991 | Dohi et al. |
| 5,023,824 A | 6/1991 | Chadima et al. |
| 5,028,083 A | 7/1991 | Mischenko |
| 5,056,161 A | 10/1991 | Breen |
| 5,113,428 A | 5/1992 | Fitzgerald |
| 5,155,659 A | 10/1992 | Kunert |
| 5,177,784 A | 1/1993 | Hu |
| 5,179,736 A | 1/1993 | Scanlon |
| 5,197,332 A | 3/1993 | Shennib |
| 5,202,197 A | 4/1993 | Ansell et al. |
| 5,225,293 A | 7/1993 | Mitchell |
| 5,251,105 A | 10/1993 | Kobayashi |
| 5,267,181 A | 11/1993 | George |
| 5,281,957 A | 1/1994 | Schoolman |
| 5,293,647 A | 3/1994 | Mirmilshteyn et al. |
| 5,305,244 A | 4/1994 | Newman et al. |
| 5,369,857 A | 12/1994 | Sacherman et al. |
| 5,371,679 A | 12/1994 | Abe et al. |
| 5,381,473 A | 1/1995 | Andrea |
| 5,381,486 A | 1/1995 | Ludeke |
| 5,406,037 A | 4/1995 | Nageno |
| 5,438,626 A | 8/1995 | Neuman |
| 5,438,698 A | 8/1995 | Burton et al. |
| 5,446,788 A | 8/1995 | Lucey et al. |
| 5,469,505 A | 11/1995 | Gattey |
| 5,475,791 A | 12/1995 | Schalk et al. |
| 5,479,001 A | 12/1995 | Kumar |
| 5,491,651 A | 2/1996 | Janik |
| 5,501,571 A | 3/1996 | Van Durrett et al. |
| 5,515,303 A | 5/1996 | Cargin et al. |
| 5,535,437 A | 7/1996 | Karl et al. |
| 5,553,312 A | 9/1996 | Gattey et al. |
| 5,555,490 A | 9/1996 | Carroll |
| 5,555,554 A | 9/1996 | Hofer |
| 5,563,952 A | 10/1996 | Mercer |
| 5,572,401 A | 11/1996 | Carroll |
| 5,572,623 A | 11/1996 | Pastor |
| 5,579,400 A | 11/1996 | Ballein |
| 5,581,492 A | 12/1996 | Janik |
| 5,604,050 A | 2/1997 | Brunette et al. |
| 5,604,813 A | 2/1997 | Evans et al. |
| 5,607,792 A | 3/1997 | Garcia et al. |
| 5,637,417 A | 6/1997 | Engmark |
| 5,665,485 A | 9/1997 | Kuwayama et al. |
| 5,671,037 A | 9/1997 | Ogasawara et al. |
| 5,673,325 A | 9/1997 | Andrea |
| 5,673,364 A | 9/1997 | Bialik |
| 5,680,465 A | 10/1997 | Boyden |
| 5,716,730 A | 2/1998 | Deguchi |
| 5,719,743 A | 2/1998 | Jenkins et al. |
| 5,719,744 A | 2/1998 | Jenkins et al. |
| 5,749,072 A | 5/1998 | Mazurkiewicz et al. |
| 5,757,339 A | 5/1998 | Williams et al. |
| 5,762,512 A | 6/1998 | Trant et al. |
| 5,766,794 A | 6/1998 | Brunette et al. |
| 5,774,096 A | 6/1998 | Usuki et al. |
| 5,774,837 A | 6/1998 | Yeldener |
| 5,778,026 A | 7/1998 | Zak |
| 5,781,644 A | 7/1998 | Chang |
| 5,787,166 A | 7/1998 | Ullman |
| 5,787,361 A | 7/1998 | Chen |
| 5,787,387 A | 7/1998 | Aguilar |
| 5,787,390 A | 7/1998 | Quinquis |
| 5,793,865 A | 8/1998 | Leifer |
| 5,793,878 A | 8/1998 | Chang |
| 5,832,098 A | 11/1998 | Chen |
| 5,841,630 A | 11/1998 | Seto et al. |
| 5,841,859 A | 11/1998 | Chen |
| 5,844,824 A | 12/1998 | Newman et al. |
| 5,856,038 A | 1/1999 | Mason |
| 5,857,148 A | 1/1999 | Weisshappel et al. |
| 5,860,204 A | 1/1999 | Krengel |
| 5,862,241 A | 1/1999 | Nelson |
| 5,869,204 A | 2/1999 | Kottke et al. |
| 5,873,070 A | 2/1999 | Bunte et al. |
| 5,890,074 A | 3/1999 | Rydbeck |
| 5,890,108 A | 3/1999 | Yeldener |
| 5,895,729 A | 4/1999 | Phelps et al. |
| 5,905,632 A | 5/1999 | Seto et al. |
| 5,931,513 A | 8/1999 | Conti |
| 5,933,330 A | 8/1999 | Beutler et al. |
| 5,935,729 A | 8/1999 | Mareno |
| 5,991,085 A | 11/1999 | Rallison et al. |
| 5,999,085 A | 12/1999 | Szwarc |
| 6,014,619 A | 1/2000 | Wuppermann et al. |
| 6,016,347 A | 1/2000 | Magnasco |
| 6,021,207 A | 2/2000 | Puthuff et al. |
| 6,036,100 A | 3/2000 | Asami |
| 6,051,334 A | 4/2000 | Tsurumaru |
| 6,060,193 A | 5/2000 | Remes |
| 6,061,647 A | 5/2000 | Barrett |
| 6,071,640 A | 6/2000 | Robertson et al. |
| 6,075,857 A | 6/2000 | Doss et al. |
| 6,078,825 A | 6/2000 | Hahn et al. |
| 6,084,556 A | 7/2000 | Zwern |
| 6,085,428 A | 7/2000 | Casby et al. |
| 6,091,546 A | 7/2000 | Spitzer |
| 6,101,260 A | 8/2000 | Jensen et al. |
| 6,114,625 A | 9/2000 | Hughes et al. |
| 6,120,932 A | 9/2000 | Slipy et al. |
| 6,127,990 A | 10/2000 | Zwern |
| 6,136,467 A | 10/2000 | Phelps et al. |
| 6,137,868 A | 10/2000 | Leach |
| 6,137,879 A | 10/2000 | Papadopoulos et al. |
| 6,154,669 A | 11/2000 | Hunter et al. |
| 6,157,533 A | 12/2000 | Sallam |
| 6,160,702 A | 12/2000 | Lee |
| 6,167,413 A | 12/2000 | Daley |
| 6,171,138 B1 | 1/2001 | Lefebvre et al. |
| 6,179,192 B1 | 1/2001 | Weinger et al. |
| 6,188,985 B1 | 2/2001 | Thrift |
| 6,190,795 B1 | 2/2001 | Daley |
| 6,225,777 B1 | 5/2001 | Garcia et al. |
| 6,226,622 B1 | 5/2001 | Dabbiere |
| 6,229,694 B1 | 5/2001 | Kono |
| 6,230,029 B1 | 5/2001 | Hahn et al. |
| 6,235,420 B1 | 5/2001 | Ng |
| 6,237,051 B1 | 5/2001 | Collins |
| 6,252,970 B1 | 6/2001 | Poon et al. |
| 6,261,715 B1 | 7/2001 | Nakamura et al. |
| 6,302,454 B1 | 10/2001 | Tsurumaru |
| 6,304,430 B1 | 10/2001 | Laine |
| 6,304,459 B1 | 10/2001 | Toyosato et al. |
| 6,310,888 B1 | 10/2001 | Hamlin |
| 6,324,053 B1 | 11/2001 | Kamijo |
| 6,325,507 B1 | 12/2001 | Jannard |
| 6,326,543 B1 | 12/2001 | Lamp |
| 6,327,152 B1 | 12/2001 | Saye |
| 6,339,706 B1 | 1/2002 | Tillgren |
| 6,339,764 B1 | 1/2002 | Livesay et al. |
| 6,349,001 B1 | 2/2002 | Spitzer |
| 6,353,313 B1 | 3/2002 | Estep |
| 6,356,635 B1 | 3/2002 | Lyman et al. |
| 6,357,534 B1 | 3/2002 | Buetow et al. |
| 6,359,603 B1 | 3/2002 | Zwern |
| 6,359,777 B1 | 3/2002 | Newman |

| Patent No. | Date | Inventor |
|---|---|---|
| 6,359,995 B1 | 3/2002 | Ou |
| 6,364,126 B1 | 4/2002 | Enriquez |
| 6,369,952 B1 | 4/2002 | Rallison et al. |
| 6,371,535 B2 | 4/2002 | Wei |
| 6,373,693 B1 | 4/2002 | Seto et al. |
| 6,373,942 B1 | 4/2002 | Braund |
| 6,374,126 B1 | 4/2002 | MacDonald, Jr. et al. |
| 6,376,942 B1 | 4/2002 | Burger |
| 6,377,825 B1 | 4/2002 | Kennedy et al. |
| 6,384,591 B1 | 5/2002 | Estep |
| 6,384,982 B1 | 5/2002 | Spitzer |
| 6,386,107 B1 | 5/2002 | Rancourt |
| 6,394,278 B1 | 5/2002 | Reed |
| 6,434,251 B1 | 8/2002 | Jensen et al. |
| 6,445,175 B1 | 9/2002 | Estep |
| 6,446,042 B1 | 9/2002 | Detlef |
| 6,453,020 B1 | 9/2002 | Hughes et al. |
| 6,466,681 B1 | 10/2002 | Siska, Jr. |
| 6,496,111 B1 | 12/2002 | Hosack |
| 6,500,581 B2 | 12/2002 | White et al. |
| 6,511,770 B2 | 1/2003 | Chang |
| 6,532,148 B2 | 3/2003 | Jenks |
| 6,560,092 B2 | 5/2003 | Itou et al. |
| 6,562,950 B2 | 5/2003 | Peretz et al. |
| 6,581,782 B2 | 6/2003 | Reed |
| 6,600,798 B2 | 7/2003 | Wuppermann |
| 6,615,174 B1 | 9/2003 | Arslan |
| 6,628,509 B2 | 9/2003 | Kono |
| 6,633,839 B2 | 10/2003 | Kushner et al. |
| 6,658,130 B2 | 12/2003 | Huang |
| 6,660,427 B1 | 12/2003 | Hukill |
| 6,697,465 B1 | 2/2004 | Goss |
| 6,728,325 B1 | 4/2004 | Hwang et al. |
| 6,731,771 B2 | 5/2004 | Cottrell |
| 6,743,535 B2 | 6/2004 | Yoneyama |
| 6,745,014 B1 | 6/2004 | Seibert |
| 6,749,960 B2 | 6/2004 | Takeshita |
| 6,754,361 B1 | 6/2004 | Hall |
| 6,754,632 B1 | 6/2004 | Kalinowski et al. |
| 6,757,651 B2 | 6/2004 | Vergin |
| 6,769,762 B2 | 8/2004 | Saito et al. |
| 6,769,767 B2 | 8/2004 | Swab et al. |
| 6,772,114 B1 | 8/2004 | Sluijter et al. |
| 6,772,331 B1 | 8/2004 | Hind et al. |
| 6,778,676 B2 | 8/2004 | Groth et al. |
| 6,795,805 B1 | 9/2004 | Bessette et al. |
| 6,811,088 B2 | 11/2004 | Lanzaro et al. |
| 6,826,532 B1 | 11/2004 | Casby et al. |
| 6,847,336 B1 | 1/2005 | Lemelson |
| 6,885,735 B2 | 4/2005 | Odinak et al. |
| 6,909,546 B2 | 6/2005 | Hirai |
| 6,934,675 B2 | 8/2005 | Glinski |
| 6,965,681 B2 | 11/2005 | Almqvist |
| 7,013,018 B2 | 3/2006 | Bogeskov-Jensen |
| 7,027,774 B2 | 4/2006 | Kuon |
| 7,046,649 B2 | 5/2006 | Awater et al. |
| 7,050,598 B1 | 5/2006 | Ham |
| 7,052,799 B2 | 5/2006 | Zatezalo et al. |
| 7,063,263 B2 | 6/2006 | Swartz et al. |
| 7,076,236 B2 | 7/2006 | Ihira et al. |
| 7,082,393 B2 | 7/2006 | Lahr |
| 7,085,543 B2 | 8/2006 | Nassimi |
| 7,099,464 B2 | 8/2006 | Lucey et al. |
| 7,106,877 B1 | 9/2006 | Linville |
| 7,107,057 B2 | 9/2006 | Arazi et al. |
| 7,110,800 B2 | 9/2006 | Nagayasu et al. |
| 7,110,801 B2 | 9/2006 | Nassimi |
| 7,136,684 B2 | 11/2006 | Matsuura et al. |
| 7,143,041 B2 | 11/2006 | Sacks et al. |
| 7,181,402 B2 | 2/2007 | Jax |
| 7,203,651 B2 | 4/2007 | Baruch et al. |
| 7,225,130 B2 | 5/2007 | Roth et al. |
| 7,242,765 B2 | 7/2007 | Hairston |
| 7,343,177 B2 | 3/2008 | Seshadri et al. |
| 7,343,283 B2 | 3/2008 | Ashley |
| 7,346,175 B2 | 3/2008 | Hui et al. |
| 7,369,991 B2 | 5/2008 | Manabe et al. |
| 7,391,863 B2 | 6/2008 | Viduya |
| 7,496,387 B2 | 2/2009 | Byford et al. |
| 7,519,186 B2 | 4/2009 | Varma et al. |
| 7,519,196 B2 | 4/2009 | Bech |
| 7,596,489 B2 | 9/2009 | Kovesi et al. |
| 2001/0017925 A1 | 8/2001 | Ceravolo |
| 2001/0017926 A1 | 8/2001 | Vicamini |
| 2001/0036291 A1 | 11/2001 | Pallai |
| 2001/0046305 A1 | 11/2001 | Muranami |
| 2002/0003889 A1 | 1/2002 | Fischer |
| 2002/0015008 A1 | 2/2002 | Kishida |
| 2002/0016161 A1 | 2/2002 | Dellien |
| 2002/0067825 A1 | 6/2002 | Baranowski |
| 2002/0068610 A1 | 6/2002 | Anvekar |
| 2002/0076060 A1 | 6/2002 | Hall |
| 2002/0091526 A1 | 7/2002 | Kiessling |
| 2002/0104025 A1* | 8/2002 | Wrench, Jr. .................. 713/202 |
| 2002/0110246 A1 | 8/2002 | Gosior |
| 2002/0111197 A1 | 8/2002 | Fitzgerald |
| 2002/0131616 A1 | 9/2002 | Bronnikov |
| 2002/0152065 A1 | 10/2002 | Kopp |
| 2002/0159574 A1 | 10/2002 | Stogel |
| 2003/0095525 A1 | 5/2003 | Lavin |
| 2003/0103413 A1 | 6/2003 | Jacobi, Jr. |
| 2003/0130852 A1 | 7/2003 | Tanaka |
| 2003/0179888 A1 | 9/2003 | Burnett |
| 2003/0182243 A1 | 9/2003 | Gerson |
| 2003/0212480 A1 | 11/2003 | Lutter |
| 2003/0217367 A1 | 11/2003 | Romano |
| 2003/0228023 A1 | 12/2003 | Burnett |
| 2004/0010407 A1 | 1/2004 | Kovesi |
| 2004/0024586 A1 | 2/2004 | Andersen |
| 2004/0046637 A1 | 3/2004 | Van Swaay |
| 2004/0063475 A1 | 4/2004 | Weng |
| 2004/0091129 A1 | 5/2004 | Jensen |
| 2005/0149414 A1 | 7/2005 | Schrodt |
| 2005/0232436 A1 | 10/2005 | Nagayasu |
| 2005/0272401 A1 | 12/2005 | Zatezalo |
| 2007/0110053 A1* | 5/2007 | Soni et al. .................. 370/389 |
| 2007/0223766 A1 | 9/2007 | Davis |
| 2007/0266447 A1* | 11/2007 | Hollander .................. 726/34 |

FOREIGN PATENT DOCUMENTS

| | | |
|---|---|---|
| DE | 2628259 | 12/1997 |
| DE | 102008031017 | 12/2009 |
| EP | 0380290 | 8/1990 |
| EP | 0531645 | 3/1997 |
| EP | 1018854 | 7/2000 |
| EP | 1185135 | 3/2002 |
| EP | 1383029 | 1/2004 |
| GB | 2275846 | 9/1994 |
| JP | 55051594 | 4/1980 |
| JP | 57028570 | 2/1982 |
| JP | 54100612 | 7/1997 |
| JP | 11055776 | 2/1999 |
| WO | WO9737480 | 10/1997 |
| WO | WO2006019340 | 2/2006 |
| WO | WO2008089444 | 7/2008 |

OTHER PUBLICATIONS

Twelve-Page International Search Report mailed Jan. 31, 2011 for related PCT Case PCT/US2010/055361.

Four-page Vocollect Speech Recognition Headsets brochure—Clarity and comfort. Reliable performance. Copyright Sep. 2005.

Four-page Vocollect Speech Recognition Headsets brochure—SR 30 Series Talkman High-Noise Headset. Copyright 2005.

Two-page Vocollect SR 20 Talkman Lightweight Headset Product Information Sheet. Copyright Aug. 2004.

Photographs 1-7 SR Talkman Headset Aug. 2004.

Two-page Supplemental Vocollect SR 20, Talkman Lightweight Headset Product Information Sheet. Copyright Aug. 2004.

Photographs 1-8 SR Talkman Headset.

Hong Kook Kim, et al.; A Bitstream-Based Front-End for Wireless Speech Recognition on IS-136 Communications Systems; IEEE Transactions on Speech and Audio Processing; Manuscript received Feb. 16, 2000, revised Jan. 25, 2001; 11 Pages; vol. 9; No. 5; Jul. 2001; New York, NY, US.

Mladen Russo, et al; Speech Recognition over Bluetooth ACL and SCO Links; A Comparison; Consumer Communications and Networking Conference 2005; Jan. 3-6, 2005; 5 Pages, Las Vegas, NV, US.

* cited by examiner

PORTABLE COMPUTING DEVICE AND HEADSET INTERFACE

FIELD OF THE INVENTION

Embodiments of the invention relate generally to mobile or portable computer devices and headsets used in voice-driven systems having speech recognition capabilities.

BACKGROUND

Wearable, mobile and/or portable computing devices, or terminals, are used for a wide variety of tasks. Such devices allow workers using them to maintain mobility, while providing the worker with desirable computing and data-processing functions. Furthermore, such devices may provide a communication link to a more powerful and centralized computer system, which further handles the organization of the tasks being performed. An overall integrated system may involve a combination of a central computer system for tracking and management of the tasks, a plurality of mobile devices and associated peripherals, as well as the people ("users") who use the devices and interface with the devices and/or the computer system.

To provide an interface between the central computer system and the workers, wearable devices are oftentimes voice-driven; i.e., are operated using human speech input. As such, the central computer and devices incorporate speech recognition technology. To communicate in a voice-driven system, for example, speech input must be passed into and out of the portable devices to provide the proper speech interface with a user. Through the speech interface, the workers are able to receive voice instructions, ask questions, report the progress of their tasks, and report working conditions, for example. Using such devices, the work is done virtually hands-free without equipment to juggle or paperwork to carry around.

There are various ways to pass the speech signals into and out of a device. In one scenario, a microphone and speaker located on the actual portable device may be used. However, that may not be practical in many environments. As may be appreciated, such systems are often utilized in noisy environments where the workers are exposed to various extraneous sounds that might affect the quality of their voice communication with their device and/or the central computer system. For example, a portable device, mounted on a belt or other device to secure it to the user, may be too far away from the user's mouth for effective communication. Therefore, more isolated or directional voice-capture techniques, such as headsets, have to be utilized.

Traditional wired headsets are somewhat popular for interfacing with portable devices and require a wire that extends from the headset to the device. A headset typically includes a microphone and one or more speakers. The device includes an appropriate socket for coupling with a connector or plug of the headset wire and also includes audio processing electronics for processing the speech signals sent from/to the headset. Alternatively, wireless headsets are also popular for interfacing with portable devices and communicate with the device wirelessly, such as through radio frequency (RF) communications.

In an exemplary configuration, a worker is assigned a particular headset and maintains that headset while using one of a plurality of devices. However, interoperability of the headset to a device is not always guaranteed. For example, features of a headset may be inoperable with a particular device, or vice versa. Thus, it may be desirable to associate, or otherwise link, a particular headset with a particular device such that headsets cannot be used with devices with which they are not associated.

Moreover, while workers often keep a particular headset for sanitary or other purposes, they often choose different devices with which to complete tasks from week-to-week, day-to-day, and even shift-to-shift. The devices, therefore, must remotely determine information associated with the worker for each shift. This often involves a variety of interactions that are time-consuming and can reduce the amount of time a worker performs assigned tasks. After determining the identity of a worker, the device may still be required to download additional information associated with the worker, including, if necessary, voice translation templates that are used to convert the speech input of the user to machine readable input. Thus, it may be desirable to keep at least some data on the headset and transfer that data to a device.

Furthermore, headsets with extensive processing power are often difficult and expensive to manufacture. For example, headsets often include proprietary connectors as well as extensive battery and power management systems. This additionally requires the batteries of a headset to be changed and/or recharged frequently, as there is often significant power used by the headsets. The proprietary connectors as well as the batteries and/or power management systems often add to the costs of manufacturing and assembling those headsets, eroding a profit base derived therefrom. Thus, it may be desirable to provide a headset to overcome those issues.

SUMMARY

Embodiments of the invention provide for methods of authenticating the interoperability of a headset and a device, as well as a headset and device consistent therewith. One method includes, in a headset, monitoring at least one input for a verification signal, and, in response to failing to detect the verification signal within a predetermined period of time, selectively disabling at least one of a speaker or a microphone of the headset. In an alternative embodiment, one method includes, in a device, detecting a coupling of a headset to the device, transmitting a verification signal to the headset, and receiving, from the headset, at least one of a serial number associated with the headset, an identification of a user of the headset, a security certificate, or a voice translation template associated with the user.

In one embodiment, the headset includes a speaker, a microphone, a processing unit, and a memory including program code. The program code is configured to be executed by the processing unit of the headset to authenticate the interoperability of the headset and a device, to monitor at least one input of the headset for a verification signal, and, in response to failing to detect the verification signal within a predetermined period of time, selectively disable at least one of the speaker or the microphone. In that embodiment, the headset may further include modem circuitry to communicate data to, and receive data from, the device.

In one embodiment, the device includes a processing unit, a headset interface, and a memory including program code. The program code is configured to be executed by the processing unit of the device to detect a coupling of a headset to the device, transmit a verification signal to the headset, and to receive, from the headset, at least one of a serial number associated with the headset, an identification of a user associated with the headset, a security certificate, or a voice translation template associated with the user. In that embodiment, the program code may be further configured to utilize at least a portion of the device to operate as a softmodem to communicate with the headset.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

It should be understood that the appended drawings are not necessarily to scale, presenting a somewhat simplified representation of various preferred features illustrative of the basic principles of the disclosure. The specific design features of the sequence of operations as disclosed herein, including, for example, specific dimensions, orientations, locations, and shapes of various illustrated components, will be determined in part by the particular intended application and use environment. Certain features of the illustrated embodiments may have been enlarged, distorted or otherwise rendered differently relative to others to facilitate visualization and clear understanding.

DETAILED DESCRIPTION

Hardware and Software Environment

Figure 1:
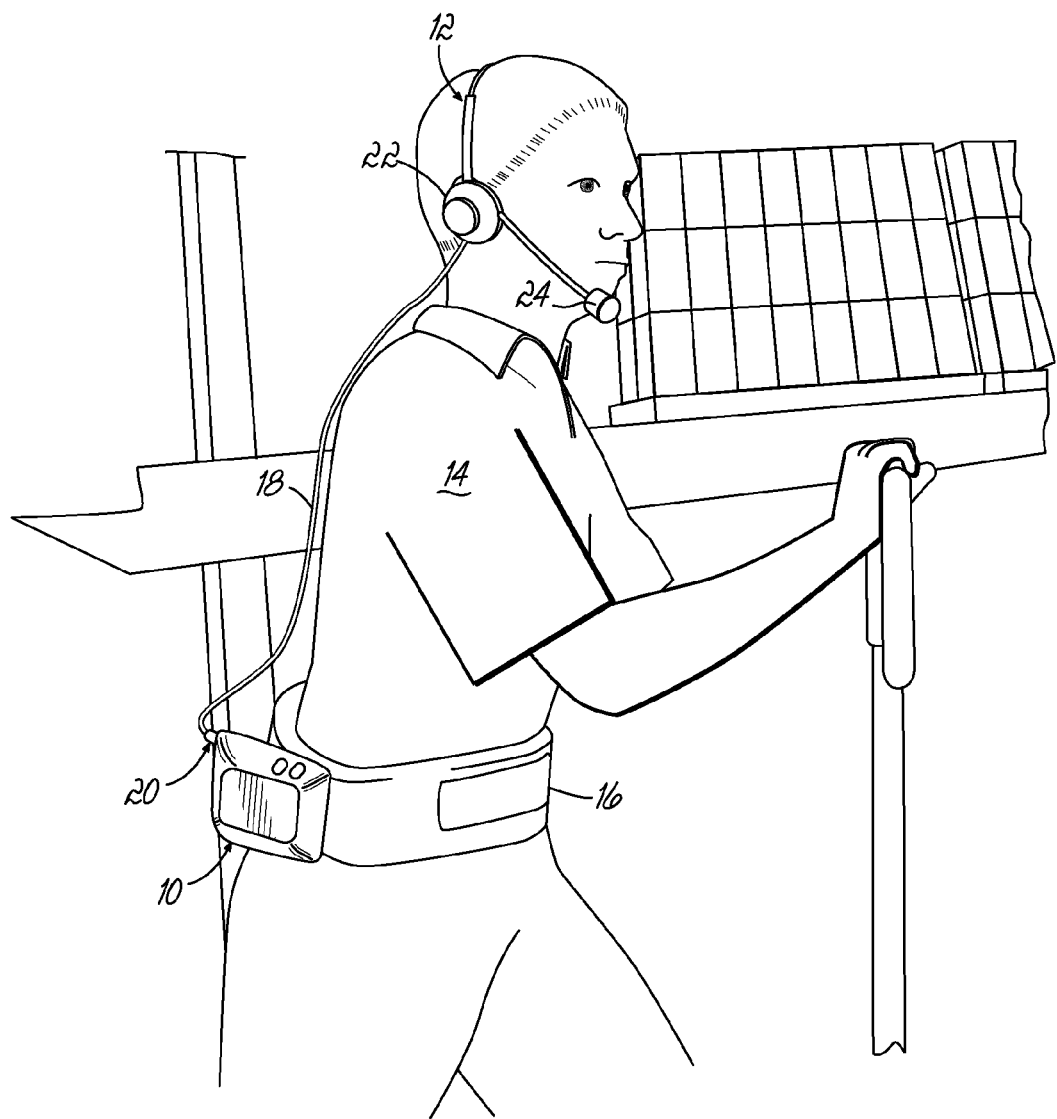
FIG. 1 is a diagrammatic illustration of a device and a headset consistent with embodiments of the invention, as worn by a user.

Turning to the drawings, wherein like numbers denote like parts throughout the several views, FIG. 1 is an illustration of a portable and/or wearable computer or device 10 (hereinafter, "device" 10) and a peripheral device or headset 12 (hereinafter, "headset" 12) consistent with embodiments of the invention. In some embodiments, the device 10 is a wearable device, which may be worn by a user 14, such as on a belt 16 as shown. In alternative embodiments, the device 10 is carried or otherwise transported, such as on a lift truck.

In some embodiments, the user 14 interfaces with the device 10 (and the device 10 interfaces with the user 14) through the headset 12, which is coupled to the device 10 through a cord 18 and a connector 20. Specifically, the headset 12 includes a speaker 22 and a microphone 24. The speaker is configured to play audio (e.g., such as to instruct the user 14 to perform an action), while the microphone 24 is configured to capture speech input from the user 14 (e.g., such as for conversion to machine readable input by the device 10). As such, and in some embodiments, the user 14 interfaces with the device 10 hands-free through the headset 12. In some embodiments, the connector 20 is an audio connector, such as a three-contact tip-ring-sleeve (TRS) audio connector, a four contact tip-ring-ring-sleeve (TRRS) audio connector, or another audio connector as is well known in the art.

Figure 2:
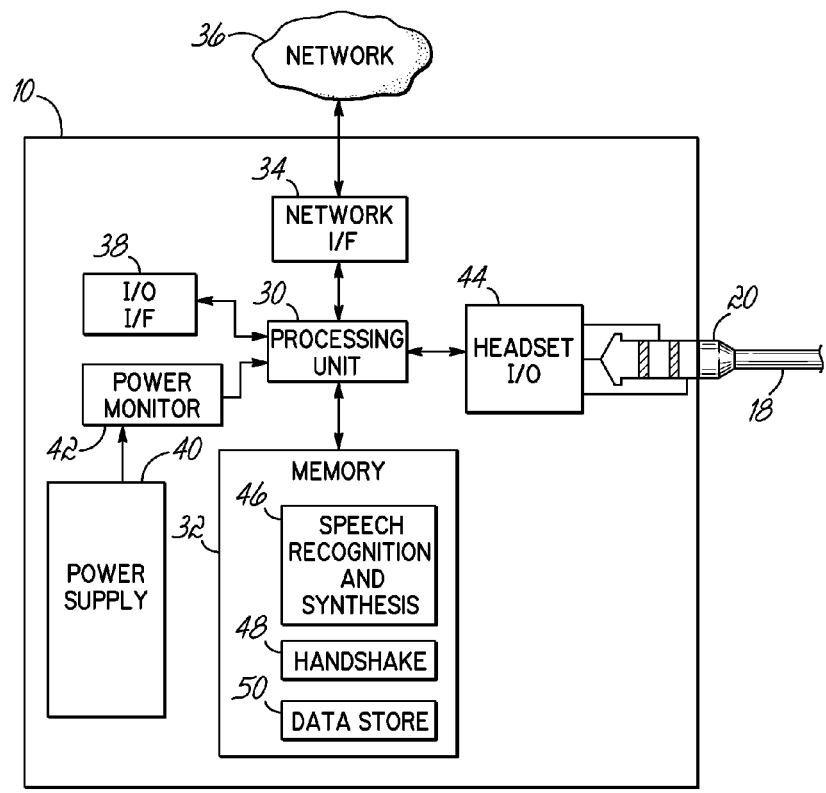
FIG. 2 is a diagrammatic illustration of at least some components of the device of FIG. 1.

FIG. 2 is a diagrammatic illustration of at least some components of the device 10 consistent with embodiments of the invention. The device 10 includes at least one processing unit 30 coupled to a memory 32. Each processing unit 30 is typically implemented in hardware using circuit logic disposed in one or more physical integrated circuit devices, or chips. Each processing unit 30 may be one or more microprocessors, micro-controllers, field programmable gate arrays, or ASICs, while memory 32 may include random access memory (RAM), dynamic random access memory (DRAM), static random access memory (SRAM), flash memory, and/or another digital storage medium, and that is also typically implemented using circuit logic disposed in one or more physical integrated circuit devices, or chips. As such, memory 32 is considered to include memory storage physically located elsewhere in the device 10, e.g., any cache memory in the at least one processing unit 30, as well as any storage capacity used as a virtual memory, e.g., as stored on a mass storage device, a computer, and/or another device coupled to the device 10, including coupled to the device 10 through at least one network interface 34 (illustrated as, and hereinafter, "network I/F" 34) by way of at least one network 36. It will be appreciated that the at least one network 36 includes at least one private communications network (e.g., such as an intranet) and/or at least one public communications network (e.g., such as the Internet). The device 10, in turn, couplex to the network 36 through the network I/F 34 with at least one wired and/or wireless connection.

In addition to the network I/F 34, and in some embodiments, the device 10 includes at least one input/output interface 38 (illustrated as, and hereinafter, "I/O I/F" 38) configured to communicate with at least one peripheral other than the headset 12. Such a peripheral may include at least one of one or more training devices (e.g., to coach a new user through training to use the device 10, headset 12, and/or a system to which they are coupled), image scanners, barcode readers, RFID readers, monitors, printers, and/or other peripherals (none shown). In specific embodiments, the I/O I/F 38 includes at least one peripheral interface, including at least one of one or more serial, universal serial bus (USB), PC Card, VGA, HDMI, DVI, and/or other interfaces (e.g., for example, other computer, communicative, data, audio, and/or visual interfaces) (none shown). The device 10 also includes a power supply 40, such as a battery, rechargeable battery, rectifier, and/or other power source. The device 10 monitors the voltage from the power supply 40 with a power monitoring circuit 42. In some embodiments, and in response to the power monitoring circuit 42 determining that the power from the power supply 40 is insufficient, the device 10 shuts down to prevent possible damage.

In some embodiments, the device 10 communicates with the headset 12 through a headset interface 44 (illustrated as, and hereinafter, "headset I/F" 44) which is in turn configured to be coupled to the connector 20 when that connector 20 is coupled to (e.g., inserted in) a corresponding portion of the device 10. Though not intending to be limiting, the connector 20 illustrated in FIG. 2 is a TRS connector as discussed hereinabove. In some embodiments, the headset I/F 44 is coupled to each electrically conductive portion of the connector 20 (e.g., the headset I/F 44 is coupled to all three electrically conductive portions of a TRS connector or all four electrically conductive portions of a TRRS connector) to communicate with the headset 12. Thus, the headset I/F 44 provides at least one electrical signal to the speaker 22 of the headset 12 (e.g., a speaker signal), receives at least one electrical signal from the microphone 24 of the headset 12 (e.g., a microphone signal), provides at least one power signal to the headset 12 on the same connection that the speaker signal is provided and/or that the microphone signal is received, and/or provides a connection to an electrical ground to the headset 12.

Furthermore, the headset I/F 44 includes at least one component configured to communicate, interpret, and/or receive a modulated signal from the headset 12. For example, at least a portion of the device 10 operates as a softmodem to exchange data with the headset 12. In particular, a softmodem is a modem with minimal hardware capacities designed to utilize at least a portion of the processing unit 30, memory 32, and/or other components of the device 10 to perform at least some tasks performed by dedicated hardware in a traditional modem. As such, the headset I/F 44 includes at least one component that is configured, along with at least a portion of the processing unit 30, memory 32, and/or other components of the device 10 to operate as a softmodem. In some embodiments, the headset I/F 44 includes one or more amplifiers (not shown) to amplify the speaker and/or microphone signal.

The device 10 may be under the control and/or otherwise rely upon various software applications, components, programs, files, objects, modules, etc. (hereinafter, "program code") consistent with embodiments of the invention. This program code may include an operating system (e.g., such as a Windows Embedded Compact operating system as distributed by Microsoft Corporation of Redmond, Wash.) (not shown) as well as one or more software applications (e.g., configured to operate in an operating system or as "stand-alone" applications). As such, the memory 32 is configured with a speech recognition and synthesis application 46 to convert speech input from the user 14 into machine readable input, as well as play a speech dialog for the user 14 (e.g., such as a speech prompt and/or other information). Moreover, the memory 32 is configured with a handshake application 48 to verify the authenticity of a headset 12 connected to the device 10. The memory 32 is further configured with a data store 50 to store data related to the device 10, headset 12, and/or user 14.

Figure 3:
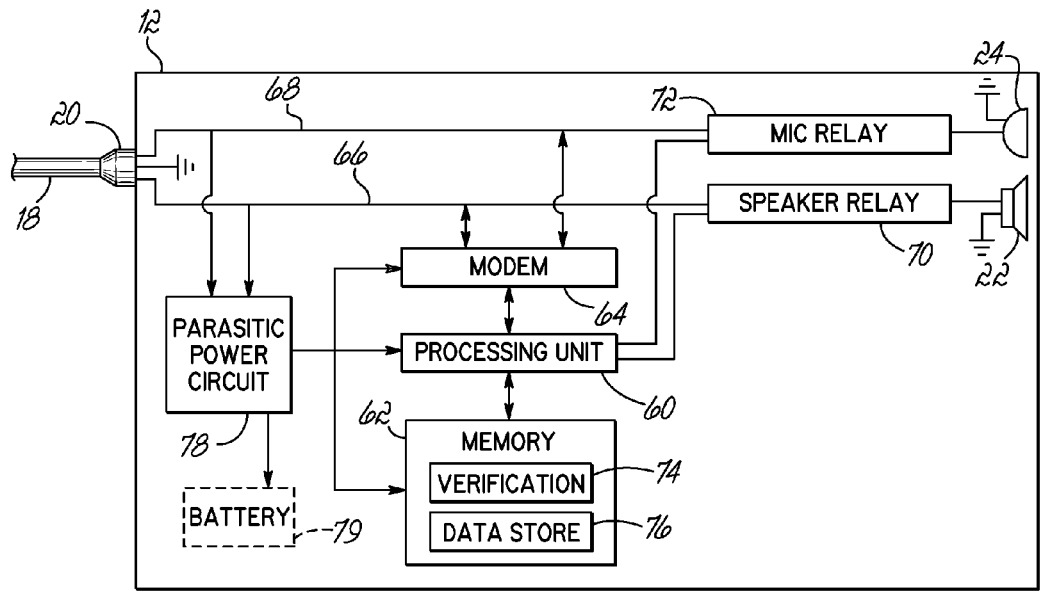
FIG. 3 is a diagrammatic illustration of at least some components of the headset of FIG. 1.

FIG. 3 is a diagrammatic illustration of at least some components of the headset 12 consistent with embodiments of the invention. The headset 12 includes at least one processing unit 60 coupled to a memory 62. Similarly to the device 10, each processing unit 60 of the headset 12 is typically implemented in hardware using circuit logic disposed in one or more physical integrated circuit devices, or chips, and may be one or more microprocessors, micro-controllers, field programmable gate arrays, or ASICs, while memory 62 may include RAM, DRAM, SRAM, flash memory, and/or another digital storage medium, which is also typically implemented using circuit logic disposed in one or more physical integrated circuit devices, or chips.

In some embodiments, the device 10 and headset 12 are configured to communicate with each other such that data can be transferred therebetween. As such, headset 12 includes at least one modulator-demodulator circuit 64 (illustrated as, and hereinafter, "modem" 64) to communicate with the device 10. In some embodiments, the modem 64 is configured to receive data from the device 10 on a line to the speaker 22 as at 66 (hereinafter, "speaker line" 66) and communicate data to the device 10 on a line from the microphone 24 as at 68 (hereinafter, "microphone line" 68). In alternative embodiments, the modem 64 is configured to receive and communicate data to the device 10 on either the speaker line 66 or the microphone line 68. In further alternative embodiments, the modem 64 is configured to receive data from the device 10 on the microphone line 68 and communicate data to the device 10 on the speaker line 66. It will be appreciated that at least a portion of the modem 64 may be implemented using circuit logic disposed in one or more physical integrated circuit devices, or chips.

The processing unit 60 controls the coupling of the speaker 22 to the speaker line 66 through a speaker relay 70 configured therebetween. Similarly, the processing unit 60 controls the coupling of the microphone 24 to the microphone line 68 through a microphone relay 72 configured therebetween. Thus, the processing unit 60 is configured to selectively control the coupling of the speaker 22 and/or microphone 24 to the device 10. In some embodiments, each of the relays 70, 72 is a normally-closed relay such that the relays 70, 72 are closed absent at least one signal from another component of the headset 12 (e.g., a signal from the processing unit 60, a power signal, and/or a signal from another component of the headset 12), while in alternative embodiments each of the relays 70, 72 is a normally-open relay such that the relays 70, 72 are open absent at least one signal (e.g., a signal from the processing unit 60, a power signal, and/or a signal from another component of the headset 12). In further alternative embodiments, at least one of the relays 70, 72 is a normally-closed relay while the other is a normally-open relay.

The headset 12, similarly to the device 10, may be under the control and/or otherwise rely upon various operating systems, software applications, components, programs, files, objects, modules, etc. (hereinafter, "program code") consistent with embodiments of the invention. As such, the memory 62 is configured with a verification application 74 to verify the interoperability of the device 10 and the headset 12. The memory 62 is further configured with a data store 76 to store data related to the device 10, headset 12, and/or user 14.

The headset 12 is configured to draw power from the device 10 through the speaker line 66 and/or the microphone line 68 via a parasitic power converter 78. In particular, the parasitic power converter 78 is configured to selectively convert electrical signals from the device 10 into power signals for the processing unit 60, memory 62, modem 64, relays 70, 72, and/or additional components of the headset 12 (power connections not shown). The parasitic power converter 78 includes at least one rectifier (not shown) to convert the electrical signals from the device into a power signal and at least one energy storage device (e.g., such as a capacitor) (not shown) for stabilizing power to the headset 12. The headset 12 may therefore operate without a battery, advantageously decreasing fabrication, part, and/or assembly costs. Optionally, the headset 12 includes a battery 79 that is charged by the parasitic power converter 78.

Figure 4:
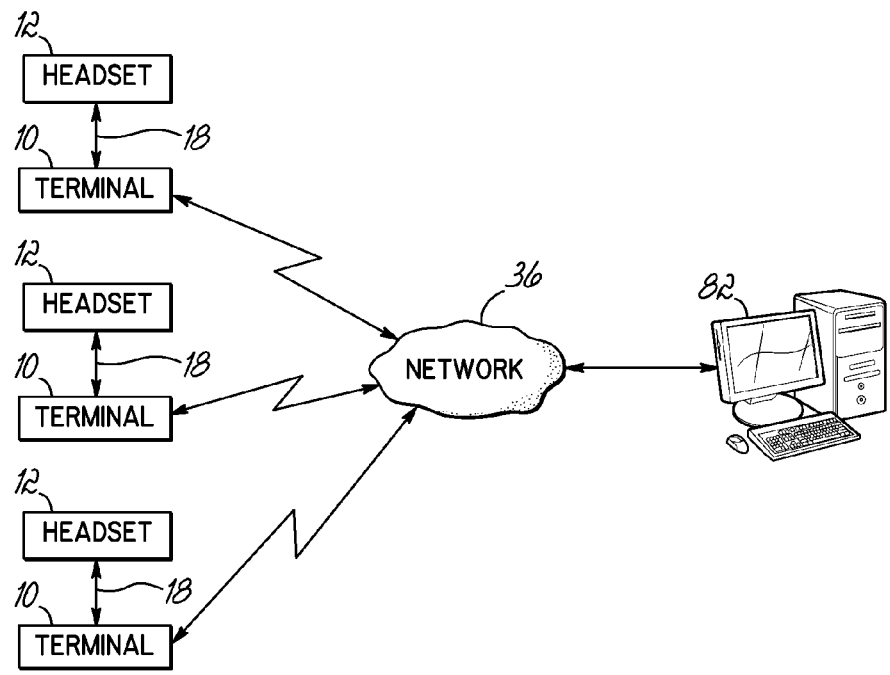
FIG. 4 is a diagrammatic illustration of a system configured with a plurality of devices and respective plurality of headsets consistent with embodiments of the invention.

FIG. 4 is a diagrammatic illustration of a system 80 that includes a plurality of devices 10 and headsets 12 consistent with embodiments of the invention. In some embodiments, each device 10 is coupled with at least one headset 12 and in wireless communication with a computing system 82 through the network 36. Computing system 82, in specific embodiments, is a computer, computer system, computing device, server, disk array, or programmable device such as a multi-user computer, a single-user computer, a handheld device, a networked device (including a computer in a cluster configuration), a mobile phone, a video game console (or other gaming system), etc. The computing system 82, in turn, is coupled to the network 36 through a wired and/or wireless connection. In alternative embodiments, each of the devices 10 is in direct wireless communication with the computing system 82.

In some embodiments, the system 80 is configured to allow a variety of users 14 to communicate with the computing system 82 for sending and receiving information regarding the activities and tasks to be performed. The computing system 82 may execute program code for handling a particular task, such as inventory and warehouse management. In turn, the computing system 82 may provide each device 10 with program code regarding activities and tasks to be performed specific to the user 14 of that particular device 10. In alternative embodiments, each of the devices 10 is a stand-alone device that operates without communication with the computing system 82.

In some embodiments, a suitable device 10 for implementing the present invention is a Talkman® wearable computer available from Vocollect, Inc., of Pittsburgh, Pa. The device 10 is in a voice-driven system, which uses speech recognition technology for documentation and/or communication. The headset 12 provides hands-free voice communication between the user 14 and the device 10. For example, in one embodiment, the device 10 receives digital instructions from the computing system 82 and converts those instructions to speech dialog (e.g., audio output) to be provided to the user 14 through the headset 12. The user 14 then replies, via speech input, which is converted to a useable digital format (e.g., machine readable input) to be stored in the device 10, transferred back to the computing system 82, and/or otherwise processed by a component of the system 80.

Embodiments of the invention address drawbacks in the prior art by providing an enhanced headset 12 that does more than simply play speech dialog from the device 10 for a user 14 and capture speech input for conversion to machine readable input by the device 10. In one embodiment, the device 10 and headset 12 are configured to authenticate their interoperability and/or transfer data regarding the device 10, headset 12, user 14, and/or system 80. In some embodiments, the device 10 and headset 12 authenticate their interoperability by exchanging verification signals, which are non-speech signals. In specific embodiments, the device 10 is configured to provide a verification signal and the headset 12 is configured to respond to the verification signal with a handshake signal. In various embodiments, the data transferred between the device 10 and the headset 12 includes a serial number associated with the headset 12, an identification of a user 14 associated with the headset 12, a security certificate, and/or a voice translation template associated with the user 14, all of which are also non-speech signals. As such, and in some embodiments, the data transferred between the device 10 and headset 12 includes a unique characterizing parameter associated with a particular user 14 and/or operational parameters associated therewith that is used to configure the device 10.

When the interoperability of the device 10 and headset 12 is not authenticated, the headset 12 is configured to selectively disable the speaker 22 and/or the microphone 24. In particular, the headset 12 is configured to selectively disable the speaker 22 and/or the microphone 24 by selectively decoupling the speaker 22 and/or the microphone 24 from the device 10 such that the speaker line 66 and/or the microphone line 68 are decoupled from the respective speaker 22 and/or microphone 24. Moreover, in some embodiments, the headset 12 is configured to receive and/or transmit data from the device 10 only in response to the authentication of interoperability. Thus, in specific embodiments, the headset 12 is configured to "lock-out" data transfer and/or all functionality in response to failing to authenticate operation with a particular device 10.

Those having ordinary skill in the art will recognize that the environments illustrated in FIGS. 1-4 are not intended to limit the scope of embodiments of the invention. In particular, the device 10, headset 12, and/or system 80 may include additional components consistent with alternative embodiments of the invention. Indeed, those having skill in the art will recognize that other alternative hardware and/or software environments may be used without departing from the scope of the invention. Additionally, those having ordinary skill in the art will appreciate that the device 10, headset 12, and/or computing system 82 may include more or fewer applications disposed therein. As such, other alternative hardware environments may be used without departing from the scope of embodiments of the invention.

The routines executed to implement the embodiments of the invention, whether implemented as part of an operating system or a specific application, component, program, object, module or sequence of instructions executed by one or more computing systems may be referred to herein as a "sequence of operations," a "program product," or, more simply, "program code." The program code typically comprises one or more instructions that are resident at various times in various memory and storage devices in a computing system, and that, when read and executed by one or more processing units of the device 10, headset 12, and/or computing system 82, cause that device 10, headset 12, and/or computing system 82 to perform the steps necessary to execute steps, elements, and/or blocks embodying the various aspects of the invention.

While the invention has and hereinafter will be described in the context of various fully functioning processing systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to physical and tangible recordable type media such as volatile and nonvolatile memory devices (e.g., solid state drives, USB drives, etc.), tapes, floppy and other removable disks, hard disk drives, optical disks (e.g., CD-ROM's, DVD's, Blu-Ray Discs, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Software Description and Flows

Figure 5:
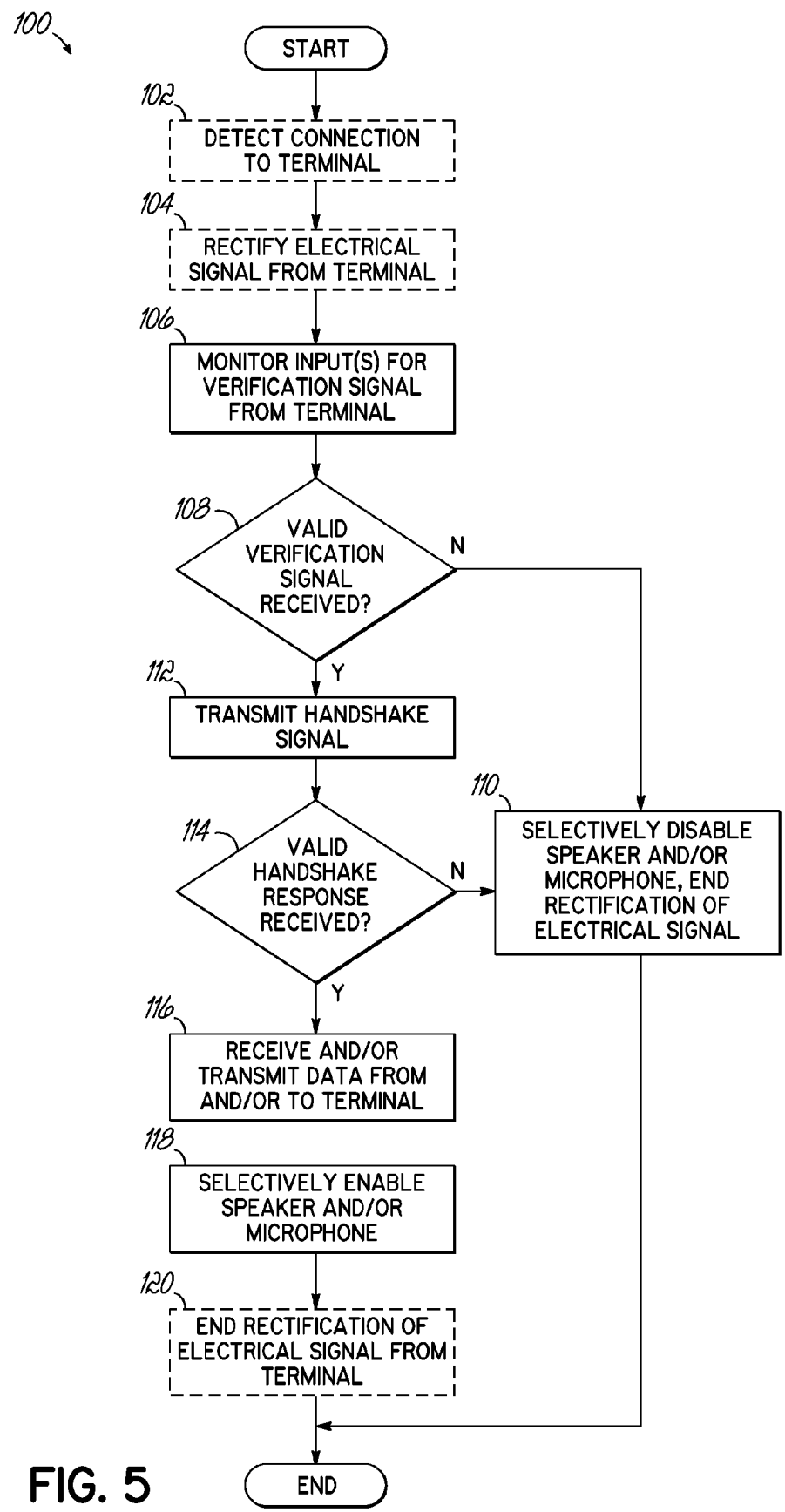
FIG. 5 is a flowchart illustrating a sequence of operations to authenticate interoperability of the device and headset of FIG. 1 from the point of view of the headset.

FIG. 5 is a flowchart 100 illustrating a sequence of operations to authenticate the interoperability of a headset and a device from the point of view of the headset consistent with embodiments of the invention. In particular, the sequence of operations occurs upon coupling (e.g., electrically connecting) the headset and device. As such, the headset initially detects a connection to the device (block 102). The headset also rectifies an electrical signal from the device (block 104). In particular, the headset rectifies an electrical signal on a speaker line of the headset. Thus, the headset draws power to operate one or more processing units, a memory, a modem, and/or at least one relay configured thereupon. The headset then monitors at least one of its inputs (e.g., an input that is coupled to a speaker line of the headset and/or an input that is coupled to a microphone line of the headset) for a verification signal from the device (block 106). It will be appreciated that block 102 and/or 104 are optional blocks and the headset may automatically begin monitoring at least one of its inputs for the verification signal as in block 106 once there is power to do so and in response to coupling the headset to the device.

At block 108, the headset determines whether a valid verification signal has been received from the device. For example, the headset monitors at least one of its inputs for a verification signal for a predetermined time of about five seconds, for example, from the time upon which it is coupled to a device, from the time it begins rectification of the electrical signal from the device, and/or from the time the headset begins monitoring at least one of its inputs for the verification signal. Alternatively, the headset monitors for a verification signal for a shorter or longer period of time. In specific embodiments, the predetermined period of time is set by a user, purchaser, and/or manufacturer of the headset. In block 108, the headset also validates the verification signal by comparing it to a stored verification signal. In various embodiments, the verification signal includes a tone, a series of tones, and/or data, such as a security certificate.

In some embodiments, in response to determining that a valid verification signal has not been received ("No" branch of decision block 108) the headset selectively disables a speaker and/or microphone configured thereupon (block 110). In some embodiments, the headset also terminates the rectification of the electrical signal in block 110, thus ending the sequence of operations. In some embodiments, the headset selectively disables the speaker and/or microphone by opening relays coupled to the respective speaker and/or microphone, while in alternative embodiments the headset selectively disables the speaker and/or microphone by maintaining open relays coupled to the respective speaker and/or microphone.

Returning to block 108, in response to determining that a valid verification signal has been received within the predetermined period of time ("Yes" branch of decision block 108), the headset transmits a handshake signal to the device (block 112). In some embodiments, the handshake signal indicates to the device that a valid verification signal has been received and allows the device to authenticate the interoperability of that headset with that device. As such, the handshake signal may include a tone or a series of tones, as well as data to authenticate the headset, such as a serial number associated with the headset, an identification of a user associated with the headset, a security certificate, and/or a voice translation template associated with the user to the device. In some embodiments, the device additionally utilizes the data from the handshake signal to download information specific to the user, if necessary. When the device determines that it is authorized to operate with the headset, the device transmits a handshake response signal to the headset. In response to the handshake response signal, the headset determines whether a valid handshake response has been received (block 114). This determination of the validity of the handshake response signal takes place for a predetermined period of time and also involves a comparison of a received handshake response to a stored handshake response. When a valid handshake response has not been received ("No" branch of decision block 114) (e.g., for example, a valid handshake response has not been received within a predetermined period of time and/or a received handshake response is not a valid handshake response), the headset selectively disables a speaker and/or microphone configured thereupon as well as ends the rectification of the electrical signal (block 110), and the sequence of operations may end.

In response to determining that a valid verification signal has been received from the device ("Yes" branch of decision block 108) and in response to determining that a valid handshake response has been received ("Yes" branch of block 114), the headset receives data from the device and/or transmits data to the device (block 116). In some embodiments, the headset is configured to store a voice translation template associated with its respective user and transmit that voice translation template to the device in response to a valid verification signal and valid handshake response. In those embodiments, the headset is configured to store additional data, such as a serial number for the headset, an identification of the user of the headset, and/or a security certificate. For example, each user may desires to keep and maintain their own headset for sanitary or other purposes. Thus, users are issued headsets and may choose from among a plurality of devices. By configuring data specific to the user on each headset, time and effort is not spent determining a user associated with a headset and/or downloading data specific to the user, advantageously allowing quicker use of the system, potential time savings in reducing login procedures, and increased efficiency.

In alternative embodiments, when a valid verification signal has been received ("Yes" branch of decision block 108), after a valid handshake response has been received ("Yes" branch of decision block 114), and/or after data has been received from and/or transmitted to a device (block 116), the headset selectively enables the speaker and/or microphone (block 118). In some of the alternative embodiments, the headset selectively enables the speaker and/or microphone by closing relays coupled to the respective speaker and/or microphone, while in other alternative embodiments the headset selectively enables the speaker and/or microphone by maintaining closed relays coupled to the respective speaker and/or microphone. Thus, the device is configured to capture speech input from the user through the microphone and play speech dialog for the user through the speaker when the interoperability of the headset and the device is authenticated. In an optional step, in response to selectively enabling the speaker and/or microphone (block 118), the headset end rectifications of the electrical signal from the device (block 120). It will be appreciated that, in alternative embodiments, the headset continues rectification of the electrical signal and, in further alternative embodiments, the device periodically provides a heartbeat to which the headset is responsive to maintain the connection of the speaker and/or microphone to the device.

Figure 6:
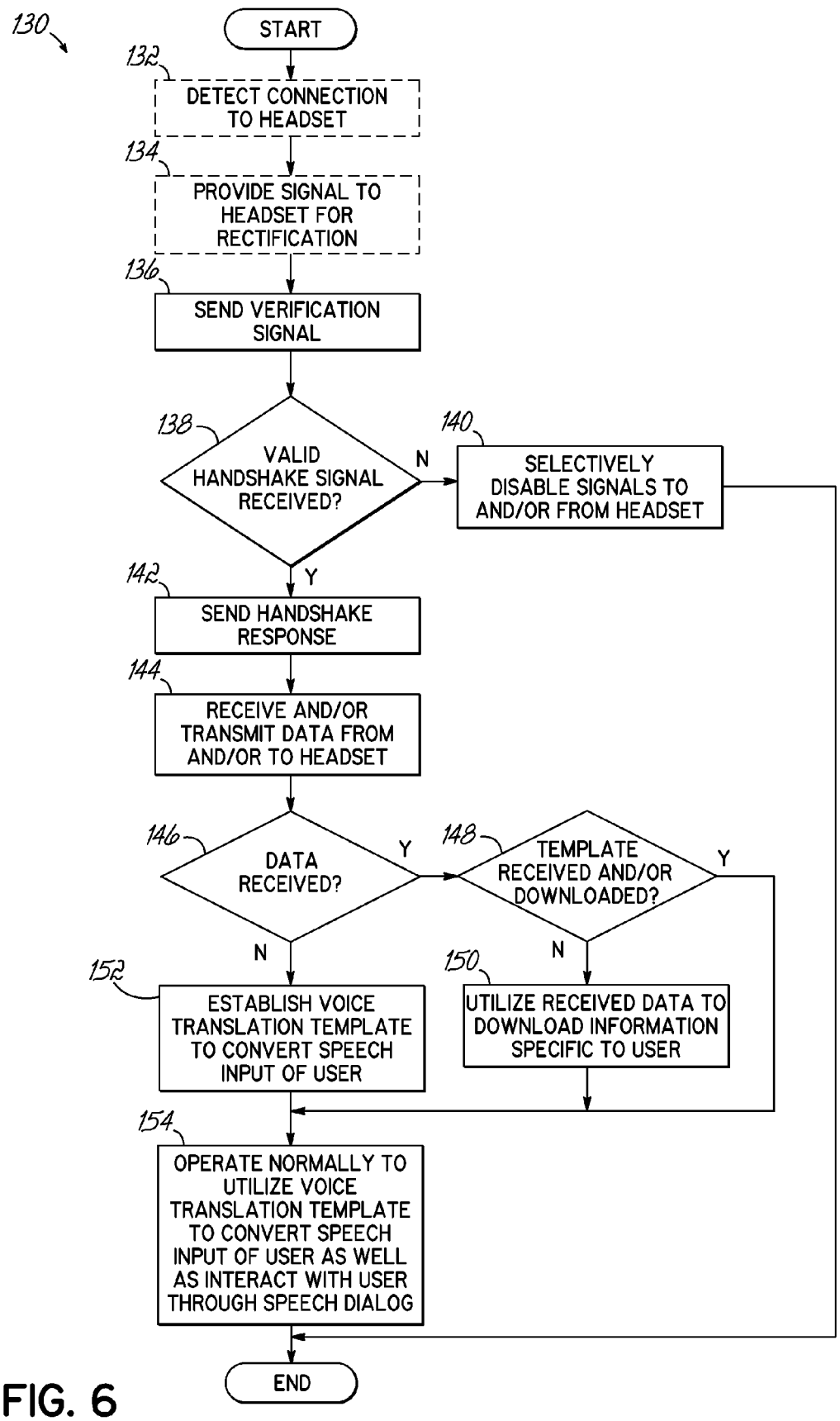
FIG. 6 is a flowchart illustrating a sequence of operations to authenticate interoperability of the device and headset of FIG. 1 from the point of view of the device.

FIG. 6 is a flowchart 130 illustrating a sequence of operations to authenticate the interoperability of a headset and device from the point of view of the device consistent with embodiments of the invention. In particular, the sequence of operations occur upon coupling (e.g., electrically connecting) a headset and device. In two optional steps, the device initially detects a connection to the headset (block 132) and provides an electrical signal to the headset for rectification (block 134).

Specifically, the device provides the electrical signal through a connection to the speaker, microphone, and/or another dedicated line to the headset. The device then sends a verification signal to the headset (block 136).

After sending the verification signal (block 136), the device determines whether a valid handshake signal is received from the headset (block 138). This determination takes place for a predetermined period of time and also involves a comparison of a received handshake signal to a stored handshake signal. When a valid handshake signal is not received ("No" branch of decision block 138) (e.g., for example, a valid handshake signal is not received within a predetermined period of time and/or a received handshake signal is not a valid handshake signal), the device selectively disables signals to and/or from the headset (e.g., including the electrical signal) (block 140) and the sequence of operations may end. Specifically, the device selectively disables at least one signal to and/or from the headset by prohibiting the transmission of at least one signal to the headset and/or ignoring at least one signal from the headset. When the device determines that a valid handshake signal is received ("Yes" branch of decision block 138), the device sends a handshake response (block 142). In some embodiments, the device additionally receives data from the headset and/or transmits data to the headset (block 144) similarly as described in connection with FIG. 5.

Returning to FIG. 6, when data is received from the headset ("Yes" branch of decision block 146), the device determines whether the received data includes a voice translation template that is, in turn, be used as a template to convert speech input of the user into machine readable input (block 148). When the received data does not include a voice translation template ("No" branch of decision block 148), the device utilizes the received data to download information specific to the user (block 150). For example, the received data may include a serial number for the headset, an identification of the user of the headset, and/or a security certificate. The device, in turn, is configured to utilize the received data to request a voice translation template associated with a user in turn associated with that data from a separate computing system. For example, in some embodiments, the device provides the separate computing system with the serial number of the headset and requests a voice translation template, or other information, associated with a user of the specified headset and/or associated with the headset itself. In alternative embodiments, the device provides the separate computing system with the identification of the user and requests a voice translation template, or other information, associated with that user. In further alternative embodiments, the device provides the separate computing system with the security certificate and requests a voice translation template, or other information, associated with the user that is in turn associated with that security certificate. Returning to block 146, when the device does not receive data from the headset ("No" branch of decision block 146), the device attempts to establish a voice translation template for the user (block 152). In particular, the device may attempt to establish a voice translation template when the user first uses the device, headset, and/or system. In some embodiments, this voice translation template is subsequently stored in the device or headset, and/or provided to the computing system for storage.

In response to receiving a voice translation template from the headset ("Yes" branches of decision blocks 146 and 148), in response to downloading a voice translation template from the computing system (block 150), or in response to establishing a voice translation template (block 152), the device converts speech input of a user into machine readable input and interacts with the user through speech dialog (block 154).

In some embodiments, the device is configured to provide a heartbeat to the headset, the headset being responsive to the heartbeat to maintain the connection of the speaker and/or microphone to the device.

Figure 7:
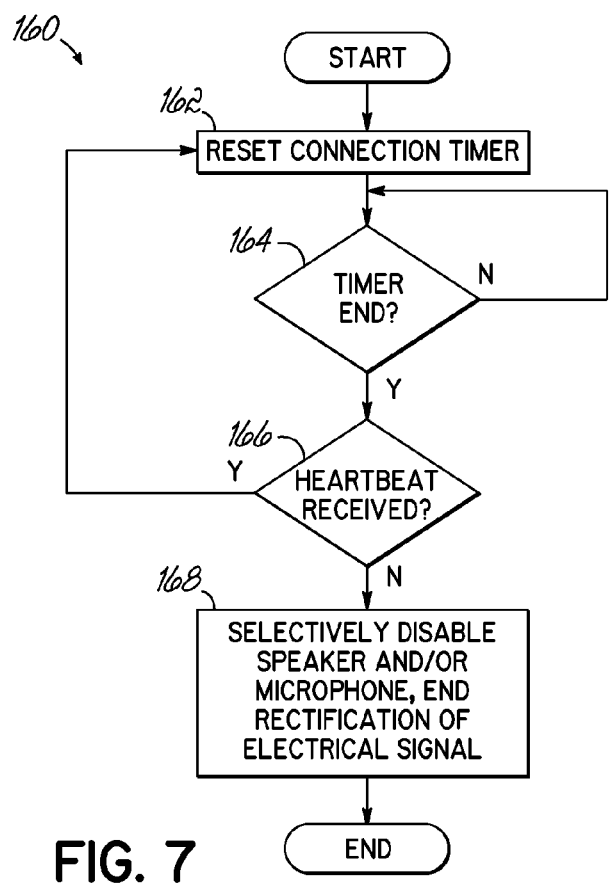
FIG. 7 is a flowchart illustrating a sequence of operations to maintain the connection of at least one of a speaker or a microphone in response to a heartbeat from the terminal of FIG. 1 in the headset of FIG. 1.

FIG. 7 is a flowchart 160 illustrating a sequence of operations for the headset to receive and respond to a heartbeat signal from the device. In particular, the flowchart 160 of FIG. 7 may be executed after the flowchart 100 of FIG. 5 such that the heartbeat is provided when the interoperability of the headset and device is authenticated. As such, and returning to FIG. 7, the headset resets a connection timer (block 162) and determines whether a connector timer has timed out (block 164). When the connection timer has not timed out ("No" branch of decision block 164) the headset continues to determine whether the connection timer has time out (block 164). When the connection timer has timed out ("Yes" branch of decision block 164) the headset determines whether a heartbeat signal has been received before the connection timer timed out (block 166). In various embodiments, the heartbeat signal includes a tone, a series of tones, and/or data that indicates that the headset should maintain the connection between the device and the speaker and/or microphone. When a heartbeat signal is received before the connection timer timed out ("Yes" branch of decision block 166) the headset again resets the connection timer (block 162). When a heartbeat signal is not received before the connection timer timed out ("No" branch of decision block 166), the headset disables the connection of a speaker and/or microphone to the device and ends the rectification of the electrical signal (block 168).

While embodiments of the invention have been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. Thus, embodiments of the invention in broader aspects are therefore not limited to the specific details, representative apparatus and method. Additionally, any of the blocks of the above flowcharts may be deleted, augmented, made to be simultaneous with another, combined, or be otherwise altered in accordance with the principles of the embodiments of the invention. Accordingly, departures may be made from such details without departing from the scope of applicant's general inventive concept.

Other modifications will be apparent to one of ordinary skill in the art. Therefore, the invention lies in the claims hereinafter appended.

What is claimed is:

1. A method of authenticating the interoperability of a headset, having a speaker and a microphone, and a device, the method comprising:

coupling the headset and device together with a cord having a speaker line coupled with the speaker and a microphone line coupled with the microphone;

in the headset, converting electrical signals from the device into power for the headset using a parasitic power circuit coupled with at least one of the speaker line or the microphone line of the cord;

using a modem circuit powered in the headset and coupled with at least one of the speaker line or the microphone line, monitoring at least one input on at least one of the speaker line or the microphone line for a verification signal from the device; and in response to failing to detect the verification signal within a predetermined period of time, selectively disabling at least one of the speaker or the microphone of the headset.

2. The method of claim 1, wherein the verification signal includes a tone signal.

3. The method of claim 1, wherein the verification signal includes a series of tone signals.

4. The method of claim 1, further comprising:
in response to receiving the verification signal from the device, using the modem circuit for transmitting a handshake signal from the headset to the device.

5. The method of claim 4, further comprising:
in response to receiving a handshake response signal from the device, using the modem circuit and transmitting at least one of a serial number associated with the headset, an identification of a user associated with the headset, a security certificate, or a voice translation template associated with the user to the device.

6. The method of claim 4, further comprising:
in response to failing to receive a handshake response signal from the device, selectively disabling at least one of the speaker or the microphone.

7. The method of claim 4, wherein the handshake signal includes a tone signal.

8. The method of claim 4, wherein the handshake signal includes a series of tone signals.

9. The method of claim 4, wherein the handshake signal includes at least a portion of a security certificate.

10. The method of claim 1, further comprising:
receiving at least one of an identification of a user associated with the headset, a security certificate, or a voice translation template associated with the user.

11. The method of claim 10, further comprising:
storing, in a memory of the headset, at least one of a serial number associated with the headset, the identification of the user, the security certificate, or the voice translation template.

12. The method of claim 1, further comprising:
selectively terminating conversion of the electrical signals from the device into power.

13. A method of authenticating the interoperability of a headset, having a speaker and a microphone, and a device, the method comprising:
coupling a headset and device together with a cord having a speaker line coupled with the speaker and a microphone line coupled with the microphone;
detecting the coupling of the headset to a device;
sending electrical signals to the headset from the device with at least one of the speaker line or the microphone line of the cord and converting the electrical signals from the device into power for the headset using a parasitic power circuit;
transmitting a verification signal to the headset;
using a modem circuit powered in the headset and coupled with at least one of the speaker line or the microphone line, sending from the headset, at least one of a serial number associated with the headset, an identification of a user associated with the headset, a security certificate, or a voice translation template associated with the user.

14. The method of claim 13, further comprising:
utilizing at least one of the serial number, the identification, the security certificate, or the voice translation template to download information specific to the user to the device from a computing system.

15. The method of claim 13 further comprising wirelessly downloading with the device at least one of the serial number, the identification, the security certificate, or the voice translation template from the computing system.

16. The method of claim 13, further comprising:
utilizing the voice translation template in the device to convert speech input associated with the user into machine readable input.

17. The method of claim 13, further comprising:
providing speech dialog to the user through a speaker of the headset.

18. The method of claim 13, further comprising:
receiving, from the headset, a handshake signal transmitted by the modem circuit; and
determining, from the handshake signal, whether the headset is authorized to communicate with the device.

19. The method of claim 18, further comprising:
in response to determining that the headset is authorized to communicate with the device, transmitting a handshake response signal to the headset.

20. A headset, comprising:
a cord having having at least a speaker line and a microphone line
a speaker coupled to the speaker line;
a microphone coupled to the microphone line;
a modem circuit coupled with at least one of the speaker line or the microphone line and configured to send and receive data;
a parasitic power circuit coupled with at least one of the speaker line or the microphone line and operable for converting electrical signals on at least one of those lines to power for the headset;
a processing unit; and
a memory including program code, the program code configured to be executed by the processing unit to authenticate the interoperability of the headset and a device, the program code further configured to monitor, with the modem circuit, at least one input of the headset from a device for a verification signal and, in response to failing to detect the verification signal within a predetermined period of time, selectively disable at least one of the speaker or the microphone.

21. The headset of claim 20, wherein the verification signal is a tone signal.

22. The headset of claim 21, wherein the program code is further configured to use the modem circuit to receive, from the device, at least one of an identification of a user associated with the headset, a security certificate, or a voice translation template associated with the user.

23. The headset of claim 22, wherein the program code is further configured to store, in the memory, at least one of a serial number associated with the headset, the identification, the security certificate, or the voice translation template.

24. The headset of claim 20, wherein the verification signal is a series of tone signals.

25. The headset of claim 20, wherein the program code is further configured to, in response to receiving the verification signal, use the modem circuit to transmit a handshake signal from the headset to the device.

26. The headset of claim 25, wherein the program code is further configured to, in response to receiving a handshake response signal from the device, use the modem circuit and transmit at least one of a serial number associated with the headset, an identification of a user associated with the headset, a security certificate, or a voice translation template associated with the user to the device.

27. The headset of claim 25, wherein the program code is further configured to, in response to failing to receive a handshake response signal from the device, selectively disable at least one of the speaker or the microphone.

28. The headset of claim 25, wherein the handshake signal includes a tone signal.

29. The headset of claim 25, wherein the handshake signal includes a series of tone signals.

30. The headset of claim 25, wherein the handshake signal includes at least a portion of a security certificate.

31. The headset of claim 20, wherein the program code is further configured to selectively terminate conversion of the electrical signals from the device into power by the parasitic power circuit.

32. A device, comprising:
a processing unit;
headset interface circuitry; and
a memory including program code;
the processing unit, memory and interface circuitry operable to provide modem communications with a headset that is coupled to the headset interface circuitry with a cord having a speaker line and a microphone line;
the program code configured to be executed by the processing unit to detect a coupling of a headset to the device and to send electrical signals to the headset from the device over at least one of the speaker line or the microphone line of the cord to be converted into power for the headset using a parasitic power circuit;
the program code further configured to transmit a verification signal to the headset, and to receive, from the headset, at least one of a serial number associated with the headset, an identification associated with a user of the headset, a security certificate, or a voice translation template associated with the user.

33. The device of claim 32, the device further comprising:
a network interface, wherein the program code is further configured to utilize at least one of the serial number, the identification, the security certificate, or the voice translation template to download information specific to the user from a computing system across a network coupled to the network interface.

34. The device of claim 33, wherein the network interface is a wireless network interface.

35. The device of claim 32, wherein the program code is further configured to utilize the voice translation template to convert speech input associated with the user into machine readable input.

36. The device of claim 32, wherein the program code is further configured to provide a speech dialog to the user through a speaker of the headset.

37. The device of claim 32, wherein the program code is further configured to received, from the headset, a handshake signal and to determine, from the handshake signal, whether the headset is authorized to communicate with the device.

38. The device of claim 37, wherein the program code is further configured to, in response to determining that the headset is authorized to communicate with the device, transmit a handshake response signal to the headset.

* * * * *

UNITED STATES PATENT AND TRADEMARK OFFICE
CERTIFICATE OF CORRECTION

| | | |
|---|---|---|
| PATENT NO. | : 8,438,659 B2 | Page 1 of 1 |
| APPLICATION NO. | : 12/613102 | |
| DATED | : May 7, 2013 | |
| INVENTOR(S) | : Yangmin Shen | |

It is certified that error appears in the above-identified patent and that said Letters Patent is hereby corrected as shown below:

In the Specification

In Column 4, Lines 34-35 read "The device 10, in turn, couplex to the network 36 through . . ." and should read --The device 10, in turn, couples to the network 36 through . . .--.

In Column 10, Line 27 reads ". . . each user may desires to keep and . . ." and should read --. . . each user may desire to keep and . . .--.

In Column 10, Lines 51-54 read "In an optional step, in response to selectively enabling the speaker and/or microphone (block 118), the headset end rectifications of the electrical signal from the device (block 120)." and should read --In an optional step, in response to selectively enabling the speaker and/or microphone (block 118), the headset ends rectification of the electrical signal from the device (block 120).--.

In Column 11, Lines 28-29 read ". . . includes a voice translation template that is, in turn, be used as a . . ." and should read --. . . includes a voice translation template that can, in turn, be used as a . . .--.

In the Claims

In Column 14, Line 20, CLAIM 20 reads ". . . a cord having having at least . . ." and should read --. . . a cord having at least . . .--.

In Column 16, Line 21, CLAIM 37 reads ". . . further configured to received, from . . ." and should read --. . . further configured to receive, from . . .--.

Signed and Sealed this
Eleventh Day of February, 2014

Michelle K. Lee
*Deputy Director of the United States Patent and Trademark Office*